US007693190B2

(12) United States Patent
Firestone et al.

(10) Patent No.: US 7,693,190 B2
(45) Date of Patent: Apr. 6, 2010

(54) LIP SYNCHRONIZATION FOR AUDIO/VIDEO TRANSMISSIONS OVER A NETWORK

(75) Inventors: Scott Firestone, Mountain View, CA (US); Madhavi Kadiyala, Los Altos, CA (US); Randall B. Baird, Austin, TX (US); Manjunath S. Bangalore, San Jose, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 11/603,849

(22) Filed: Nov. 22, 2006

(65) Prior Publication Data

US 2008/0117937 A1    May 22, 2008

(51) Int. Cl.
*H04J 3/06* (2006.01)
(52) U.S. Cl. .................. 370/503; 348/14.08; 348/14.09; 348/515
(58) Field of Classification Search .............. 348/14.09, 348/14.08, 14.12, 466, 467; 715/500.1, 716; 370/503; 386/12, 17, 52
See application file for complete search history.

(56) References Cited

U.S. PATENT DOCUMENTS

| 5,483,587 A | 1/1996 | Hogan et al. |
| 5,600,366 A | 2/1997 | Schulman |
| 5,673,253 A | 9/1997 | Shaffer |
| 5,729,687 A | 3/1998 | Rothrock et al. |
| 5,917,830 A | 6/1999 | Chen et al. |

(Continued)

FOREIGN PATENT DOCUMENTS

EP            1 553 735 A1    7/2005

(Continued)

OTHER PUBLICATIONS

Joerg Ott et al.; "Extended RTP Profile for RTCP-based feedback (RTP/AVPF)"; Jun. 29, 2002; RCF; Jun. 29, 2002; RCF; pp. 1-43 http://www.ietf.org/proceedings/01dec/I-D/draft-ietf-avt-rtcp-feedback-01 .txt .

(Continued)

*Primary Examiner*—Ricky Ngo
*Assistant Examiner*—David Oveissi
(74) *Attorney, Agent, or Firm*—Law Office of Bradley J. Bereznak (57) ABSTRACT

In one embodiment, a system includes a video mixer coupled with an audio mixer for exchange of information that includes a first set of delay values respecting input audio streams received by the audio mixer from a plurality of source endpoints, and output audio streams sent from the audio mixer to a plurality of destination endpoints. The information further including a second set of delay values respecting the corresponding input video streams. The audio mixer calculates end-to-end video delays, and the video mixer calculates end-to-end audio delays. The audio mixer delays the output audio streams to equalize the end-to-end audio and video delays in the event that the end-to-end audio delays are less than the end-to-end video delays, and the video mixer delays the output video streams to equalize the end-to-end audio and video delays in the event that the end-to-end video delays are less than the end-to-end audio delays.

9 Claims, 5 Drawing Sheets

U.S. PATENT DOCUMENTS

| | | | |
|---|---|---|---|
| 5,963,217 | A | 10/1999 | Grayson et al. |
| 6,044,081 | A | 3/2000 | Bell et al. |
| 6,137,834 | A | 10/2000 | Wine et al. |
| 6,141,324 | A | 10/2000 | Abbott et al. |
| 6,236,854 | B1 | 5/2001 | Bradshaw |
| 6,269,107 | B1 | 7/2001 | Jong |
| 6,332,153 | B1 | 12/2001 | Cohen |
| 6,501,739 | B1 | 12/2002 | Cohen |
| 6,505,169 | B1 | 1/2003 | Bhgavath et al. |
| 6,608,820 | B1 | 8/2003 | Bradshaw |
| 6,624,841 | B1 | 9/2003 | Buchner |
| 6,643,496 | B1 | 11/2003 | Shimoyama et al. |
| 6,650,652 | B1 | 11/2003 | Valencia |
| 6,671,262 | B1 | 12/2003 | Kung et al. |
| 6,674,459 | B2 * | 1/2004 | Ben-Shachar et al. .... 348/14.09 |
| 6,675,216 | B1 | 1/2004 | Quatrano et al. |
| 6,718,553 | B2 | 4/2004 | Kenworthy |
| 6,735,572 | B2 | 5/2004 | Landesmann |
| 6,744,785 | B2 | 6/2004 | Robinett et al. |
| 6,771,644 | B1 | 8/2004 | Brassil et al. |
| 6,771,657 | B1 | 8/2004 | Elstermann |
| 6,775,247 | B1 | 8/2004 | Shaffer et al. |
| 6,816,469 | B1 | 11/2004 | Kung et al. |
| 6,876,734 | B1 | 4/2005 | Summers et al. |
| 6,865,540 | B1 | 8/2005 | Faber et al. |
| 6,925,068 | B1 | 8/2005 | Stanwood et al. |
| 6,931,001 | B2 | 8/2005 | Deng |
| 6,931,113 | B2 | 8/2005 | Ortel |
| 6,937,569 | B1 | 8/2005 | Sarkar et al. |
| 6,947,417 | B2 | 9/2005 | Laursen et al. |
| 6,956,828 | B2 | 10/2005 | Simard et al. |
| 6,959,075 | B2 | 10/2005 | Cutaia et al. |
| 6,976,055 | B1 | 12/2005 | Shaffer et al. |
| 6,989,856 | B2 | 1/2006 | Firestone et al. |
| 7,003,086 | B1 | 2/2006 | Shaffer et al. |
| 7,007,098 | B1 | 2/2006 | Smyth et al. |
| 7,084,898 | B1 | 8/2006 | Firestone et al. |
| 7,127,487 | B1 | 10/2006 | Wang et al. |
| 7,379,653 | B2 * | 5/2008 | Yap et al. ...................... 386/12 |
| 2001/0000540 | A1 | 4/2001 | Cooper et al. |
| 2002/0004841 | A1 | 1/2002 | Sawatari |
| 2002/0087976 | A1 | 7/2002 | Kaplan et al. |
| 2002/0163918 | A1 | 11/2002 | Cline |
| 2003/0025786 | A1 | 2/2003 | Norsworthy |
| 2003/0076850 | A1 | 4/2003 | Jason, Jr. |
| 2003/0198195 | A1 | 10/2003 | Li |
| 2004/0057449 | A1 | 3/2004 | Black |
| 2004/0100582 | A1 * | 5/2004 | Stanger ...................... 348/515 |
| 2004/0165527 | A1 | 8/2004 | Gu et al. |
| 2004/0165710 | A1 | 8/2004 | DelHoyo et al. |
| 2004/0199659 | A1 | 10/2004 | Ishikawa et al. |
| 2004/0213152 | A1 | 10/2004 | Matuoka et al. |
| 2005/0069102 | A1 | 3/2005 | Chang |
| 2005/0078171 | A1 * | 4/2005 | Firestone et al. ......... 348/14.08 |
| 2005/0081244 | A1 | 4/2005 | Barrett et al. |
| 2005/0138372 | A1 | 6/2005 | Kajihara et al. |
| 2005/0259803 | A1 | 11/2005 | Khartabil |
| 2006/0020995 | A1 | 1/2006 | Opie et al. |
| 2006/0104458 | A1 | 5/2006 | Kenoyer et al. |
| 2006/0189337 | A1 | 8/2006 | Farrill et al. |
| 2006/0259755 | A1 | 11/2006 | Kenoyer |
| 2007/0110029 | A1 | 5/2007 | Gilmore, II et al. |
| 2007/0123284 | A1 | 5/2007 | Schliwa-Bertling et al. |
| 2007/0133435 | A1 | 6/2007 | Eneroth et al. |

FOREIGN PATENT DOCUMENTS

WO    WO 00/19693 A1    4/2000

OTHER PUBLICATIONS

T. Friedman et al.; "RTP Control Protocol Extended Reports (RTCP XR)" ; Network Working Group; Nov. 2003; pp. 1-55 http://www.ietf.org/rfc/rfc3611.txt.

Handley et al. SIP: Session Initiation Protocol. RFC 2543. Mar. 1999. pp. 13 and 14. http://tools.ietf.org/html/rfc2543.

* cited by examiner

LIP SYNCHRONIZATION FOR AUDIO/VIDEO TRANSMISSIONS OVER A NETWORK

TECHNICAL FIELD

This disclosure relates generally to the field of transmission of audio/video data packets over a network.

BACKGROUND

Human beings can detect very small differences in the synchronization between video and its accompanying audio soundtrack. People are especially good at recognizing a lack of synchronizations between the lips of speakers in video media, such as in a video conference session, and the reproduced speech they hear. Lip-synchronization ("lipsync") between audio and video is therefore essential to achieving a high quality conferencing experience.

Past approaches for ensuring good lipsync include reliance upon the Real-Time Transport Control Protocol (RTCP) mapping between timestamps generated by the separate audio and video encoding devices and a Network Time Protocol (NTP) "wall clock" time. Although useful in achieving good lipsync for point-to-point audio/video sessions, this approach breaks down in situations such as where audio and video mixers are inserted for multi-party conferences. Other approaches to the problem of lipsync include co-locating the audio and video mixers on the same device, such as is typically done in most video multipoint control units (MCUs). However, when the audio mixer and video mixer/switch are distributed one or the other of the audio or video mixing devices typically must delay its output stream to ensure that arrival time of the audio and video packets provides adequate lipsync, which can be difficult to achieve.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the present invention. However, persons having ordinary skill in the relevant arts will appreciate that these specific details may not be needed to practice the present invention.

In the context of the present application, a computer network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

In general, an endpoint represents an end user, client, or person who is capable of participating in an audio conference session via conferencing system. Endpoint devices that may be used to initiate or participate in a conference session include a personal digital assistant (PDA); a personal computer (PC), such as notebook, laptop, or desktop computer; an audio/video appliance; a streaming client; a television device with built-in camera and microphone; or any other device, component, element, or object capable of initiating or participating in exchanges with a video conferencing system.

Figure 4:
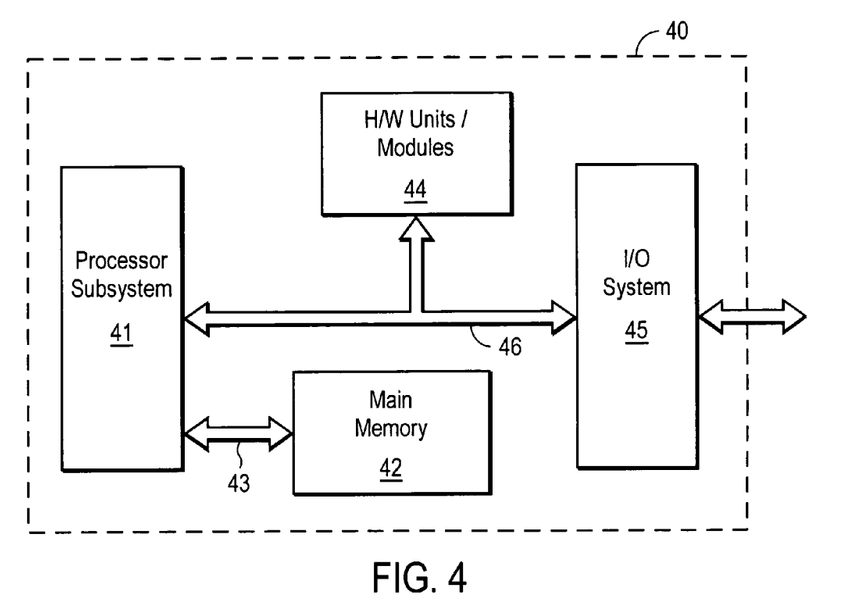
FIG. 4 illustrates basic components of an example node or network device.

FIG. 4 illustrates basic components of an example node or network device 40, which typically comprises a number of basic subsystems that includes a processor subsystem 41, a main memory 42 and an input/output (I/O) subsystem 45. Data is transferred between main memory ("system memory") 42 and processor subsystem 41 over a memory bus 43, and between the processor and I/O subsystems over a system bus 46. Examples of the system bus may include the conventional lightning data transport (or hyper transport) bus and the conventional peripheral component interconnect (PCI) bus. Device 40 may also comprise other hardware units/modules 44 coupled to system bus 46 for performing additional functions. Processor subsystem 41 may comprise one or more processors and a controller device that incorporates a set of functions including a system memory controller, support for one or more system buses and direct memory access (DMA) engines.

Figure 1:
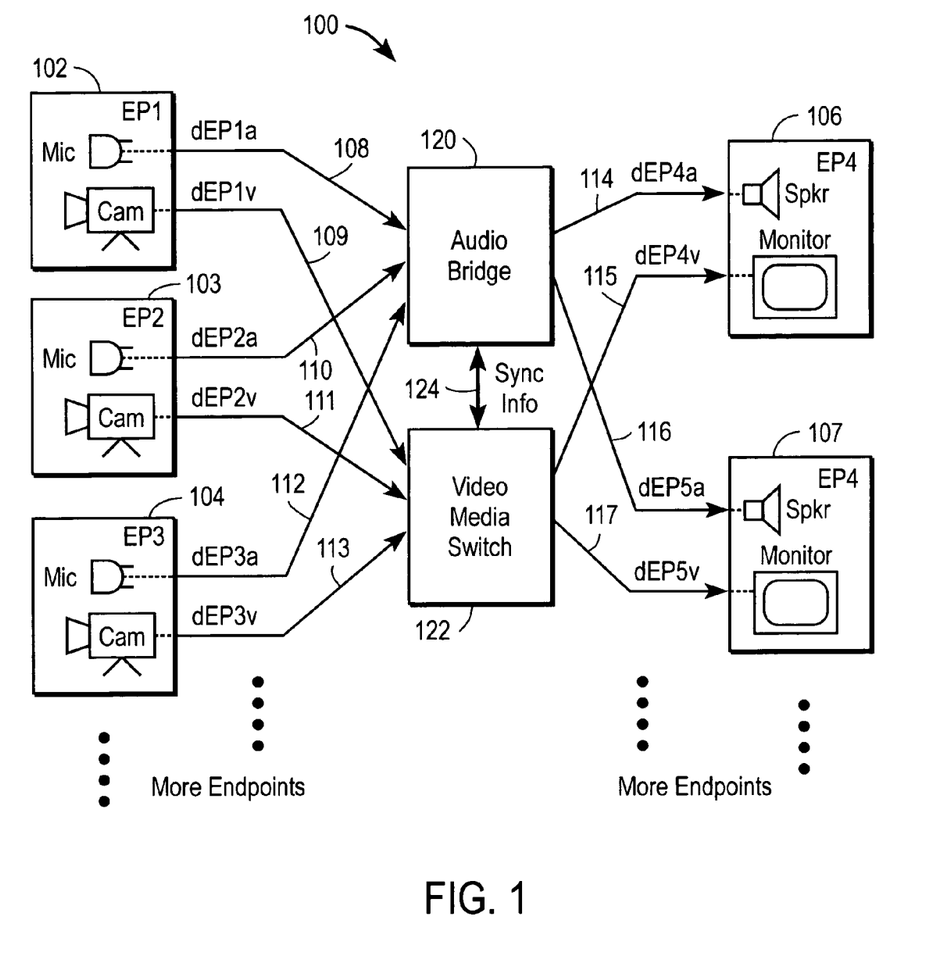
FIG. 1 illustrates an example architecture for a video conferencing system.

FIG. 1 is an example architecture of a video conferencing system 100 which comprises endpoints devices 102-107 (labeled EP1-EP5) that each send/receive audio and video packets. In this example, endpoints 102-104 are sources of audio/video content—that is, they send audio from their microphones to an audio mixer (i.e., bridge) 120. Endpoints 102-104 also send video from their associated cameras to a video media switch (MS) 122 (also known as a video mixer). It is appreciated that the audio and video mixers shown in FIG. 1 are separate, distinct devices or components that are physically located at different places on a communications network. It should be further understood that audio mixer 120 represents any device or component that combines more than one audio input stream to produce a composite audio output stream. Similarly, video mixer 122 represents any device or component that combines more than one video input stream to produce a composite video output stream.

Endpoints 106-107 represent the destination or consumers of the media content. Each endpoint 102-104 and 106-107 is provided with separate audio and video network connections. Connections 108, 110, and 112 respectively provide input from the microphones of endpoints 102, 103, and 104 to audio mixer 120, with connections 114 and 116 providing the mixed audio output generated by mixer 120 (typically of the three or four loudest participants) to the speakers of endpoints 106 and 107, respectively. Similarly, connections 109, 111, and 113 respectively provide input from the cameras of endpoints 102, 103, and 104 to MS 122. Connections 115 and 117 provide the video output generated by MS 122 to the monitors of respective endpoints 106 and 107. Although one-way paths (e.g., source/sender endpoints on the left, and destination/receiver endpoints on the right) are explicitly depicted in FIG. 1, it is appreciated that all of the endpoints shown in FIG. 1 typically operate as both receivers and senders. That is, a video conference session usually involves transmission of audio and video data packets in both directions at the same time.

In the embodiment shown, mixer 120 and MS 122 may both include a digital signal processor (DSP) or firmware/software-based system that mixes and/or switches audio/video signals received at its input ports under the control of a video conference server (not shown). The audio/video signals received at the conference server ports originate from each of the conference or meeting participants (e.g., individual conference participants using endpoint devices 102-107), and possibly from an interactive voice response (IVR) system. Conference server 20 may also incorporate or be associated with a natural language automatic speech recognition (ASR) module for interpreting and parsing speech of the participants, and standard speech-to-text (STT) and text-to-speech (TTS) converter modules.

Audio mixer 120, in addition to mixing the audio transmissions of the N loudest speakers, may also create output audio streams that have different combinations of speakers. For example, in the case where endpoint 106 is one of the loudest speakers in the video conference session, mixer 120 generates a mixed audio output to endpoint 106 via connection 114 that does not include the audio of endpoint 106. On the other hand, the audio mix output to endpoint 107 via connection 116 does include the audio generated by endpoint 106 since endpoint 106 is one of the loudest speakers. In this way, endpoint 106 does not receive an echo of its own audio output coming back from the audio mixer.

It is appreciated that in different specific implementations the media paths for the conference participants may include audio/video transmissions, e.g., Real-Time Transport Protocol (RTP) packets sent across a variety of different networks (e.g., Internet, intranet, PSTN, etc.), protocols (e.g., IP, Asynchronous Transfer Mode (ATM), Point-to-Point Protocol (PPP)), with connections that span across multiple services, systems, and devices.

FIG. 1 further illustrates the one-way network packet transmission delays from each endpoint 102-104 to audio mixer 120 and MS 122, as well as the transmission delays from audio mixer 120 and MS 122 to endpoints 106 & 107. For example, the delay on connection 108 from endpoint 102 to audio mixer 120 is labeled dEP1$a$. The delay on connection 109 from endpoint 102 to MS 122 is labeled dEP1$v$, and so on. Similarly, the mixed audio output stream sent on connection 114 from audio mixer 120 to endpoint 106 has an associated delay dEP4$a$, and the mixed video output stream sent from MS 122 to endpoint 106 via connection 115 has a transmission delay dEP4$v$.

Synchronization information is communicated between audio mixer 120 and MS 122 via connection 124. During normal operation, audio mixer 120 ensures that there is a constant offset between each of the audio streams. In other words, there is a relative synchronization in terms of the offsets between individual audio streams and the final output audio mix. This information is included in the synchronization information that audio mixer 120 sends to video mixer 122. When MS 122 receives this synchronization information it matches the relative video offsets in the summed video stream with the relative offsets that are established by audio mixer 120. (It is appreciated that this process may also work in reverse, with audio mixer 120 matching the relative audio offsets in the summed audio stream with the relative offsets that are established by MS 122.) After exchanging delay information that describes the offsets, the audio mixer and video mixer coordinate with each other to achieve synchronization at the destination endpoints.

It should be understood that in the example of FIG. 1, endpoints 102-104 and 106-107 comprise so-called "dumb" endpoints; that is, endpoint devices that do not send/receive RTCP data, nor do they rely upon timestamp information. Instead, endpoints 102-104 and 106-107 simply synchronize audio and video packets based on their arrival time at the network interface. In other words, endpoints 102-104 and 106-107 do not attempt any sort of synchronization. Senders send audio and video packets simultaneously, and receivers assume that audio and video arriving at the same time from the network are synchronous.

In order to ensure good lipsync at the destination endpoints, an out-of-band synchronization protocol is provided between mixers 120 & 122 that allows these audio and video mixers to send their respective media so that it arrives at dumb endpoints (e.g., endpoints 106 & 107) at approximately the same time, i.e., sufficient to ensure good lipsync. In one embodiment shown, mixer 120 and MS 122 execute a protocol to compute whether to delay their respective output streams, and if so, by how much, in order to insure that audio and video packets arrive synchronously at the destination endpoints. This protocol allows the separation of the audio mixer and video mixer components such that the audio from the audio mixer need not be relayed through the video media switch.

Practitioners in the art will appreciate that the delays shown in FIG. 1 may be calculated by mixer 120 and MS 122 in a variety of ways. For instance, standard network ping techniques may be utilized to calculate the network delays dEP1$a$-dEP5$a$, which information is then sent by audio mixer 120 to MS 122. Likewise, conventional delay measurement techniques may be utilized to compute the network delays dEP1$v$-dEP5$v$, which information is then sent by MS 122 to audio mixer 120. In the event that one or more of the endpoints is configured to send RTCP information, the audio mixer can send a RTCP sender report to the endpoint and receive back an RTCP receiver report in return, which may then be used to calculate a round-trip delay time.

It is appreciated that the total delay incurred on each stream from its originating endpoint up through the mixers is exchanged. This delay figure is half the aggregate round-trip time from the source endpoint (or endpoints), plus the mixer delay caused by the jitter buffers in the mixer, plus the actual mixer formation delay. This value is computed for every source pair of audio/video stream that are to be rendered at any instant in time. Information for the audio-video stream pairs that are not going to be immediately rendered by an endpoint may be omitted, as well as any audio stream that does not have a corresponding active video stream.

The first phase of the out-of-band protocol involves the audio mixer sending the video mixer (or vice versa) information regarding relative offsets between the individual components of the mix. The audio mixer sends the offset information to the video mixer so as to allow the video mixer to generate a mixed video stream that duplicates these relative offsets. It should be understood that the video mixer 122 includes its own input delay buffers, although those buffers are usually not used as jitter buffers, instead they are used to delay one or more streams so that when those streams are summed together the relative offsets between those streams are the same as the relative offsets in the audio mix. Typically, one of those delays is set to zero and the remaining delays are increased accordingly in order to achieve the necessary relative offsets. It is appreciated that the audio and video mixers may resample their respective media as necessary in order to maintain relatively constant delays through their pipelines.

The second phase of the protocol involves the audio mixer and video mixer coordinating with each other so as to achieve synchronization (lipsync) at each of the various endpoint devices.

Delay and other information may be transported between the mixers in a number of different ways. One embodiment utilizes a dummy session created between audio mixer 120 and video mixer 122, with the relevant information being encapsulated in a RTCP APP message. Other embodiments may encapsulate the information in other types of messages, signals, or streams (e.g., a XML-encoded HTTP stream between the two devices). It is appreciated that in the case of voice-activated video streams, up-to-date information is generated and exchanged immediately following an active speaker change.

Figure 2:
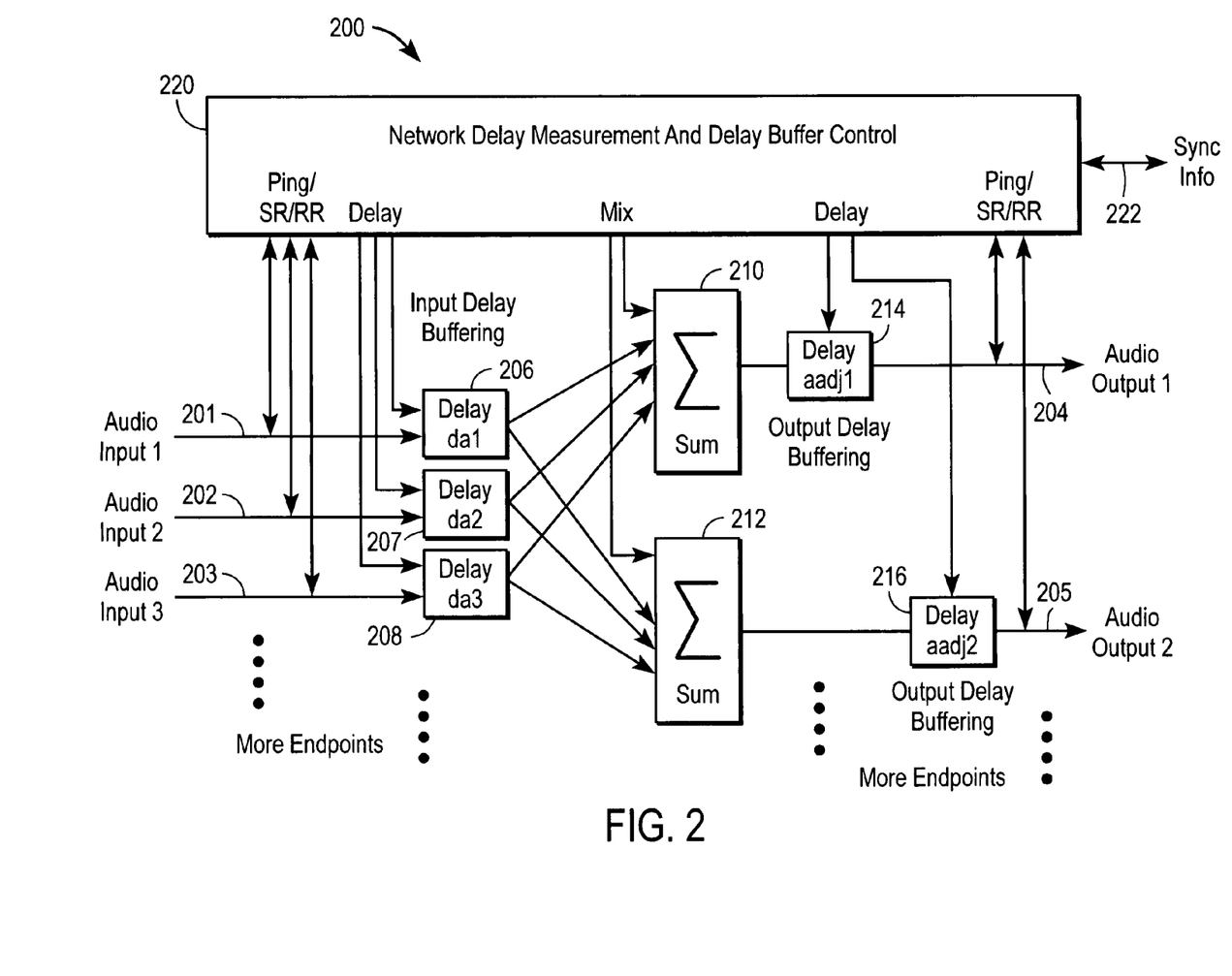
FIG. 2 is an example of one embodiment of an audio mixer.

FIG. 2 is an example of one embodiment of an audio mixer 200 that includes a network delay measurement and delay buffer control unit 220 that receives audio inputs from the various endpoint devices, e.g., audio inputs 1-3 on lines 201-203, respectively, and produces mixed audio outputs, e.g., audio outputs 1 & 2 on lines 204 & 205, respectively. In other words, audio mixer 200 sums together all the audio streams from multiple source endpoints to create one or more mixed output audio streams delivered to destination endpoints. Audio mixer 200 includes input jitter buffers 206-208 are included to supply evenly timed audio input data to summation units 210 and 212, which add together selected ones of the buffered audio input streams. Note that different buffering delays (e.g., da1, da2, da3, etc.) corresponding to different buffer depths may be selected for each jitter buffer in order to absorb data starvation resulting from network jitter.

Summation units 210 & 212 each generate a customized output audio mix for a particular destination endpoint after the relative input stream delays (dEP1$a$, dEP2$a$, dEP3$a$, etc.) have been normalized. Additional summation units can be included for more destination endpoints. Output delay buffers 214 and 216 produce audio outputs 204 and 205 that take into account the network path delays to the respective destination endpoint for proper lipsync with the matching video stream. In other words, audio mixer 200 optimally delays the result of each summation unit in order to achieve lipsync with the video streams at the receiving endpoints. This operation, for example, is achieved in FIG. 2 by delays aadj1, aadj2, etc.

A sync-info port 222 connects to the video mixer to provide audio delay/offset information and to coordinate video output delays that match the audio output deliveries at the corresponding destination endpoints. This information exchange allows the video mixer to generate a mixed video stream to match these relative delays/offsets.

Consistent with the example embodiment described above, for each audio input received from a source endpoint, audio mixer 200 sends the video mixer a value representing the sum of the one-way network audio delay from the source endpoint to the audio mixer summation (sum) unit plus the input jitter buffer delay. Additionally, for each output endpoint, the audio mixer sends a value representing the sum of the summation unit delay (i.e., adout1 & adout2 for summation units 210 & 212, respectively) plus the one-way network audio delay from the audio mixer sum unit to each corresponding destination endpoint (shown as dEP4$a$ & dEP5$a$ in FIG. 1).

By way of further example, assume that dEP1$a$=40 ms; dEP2$a$=12 ms; dEP3$a$=24 ms; da1=30 ms; da2=50 ms; da3=10 ms; adout1=4 ms; adout2=2 ms; dEP4$a$=5 ms; and dEP5$a$=7 ms. Given these delays, and further assuming zero adjustment delays (aadj1 & aadj2) at this point and no other endpoints in the example of FIGS. 1 & 2, audio mixer 200 sends the values shown in Table 2 to the video mixer:

TABLE 2

Figure 3:
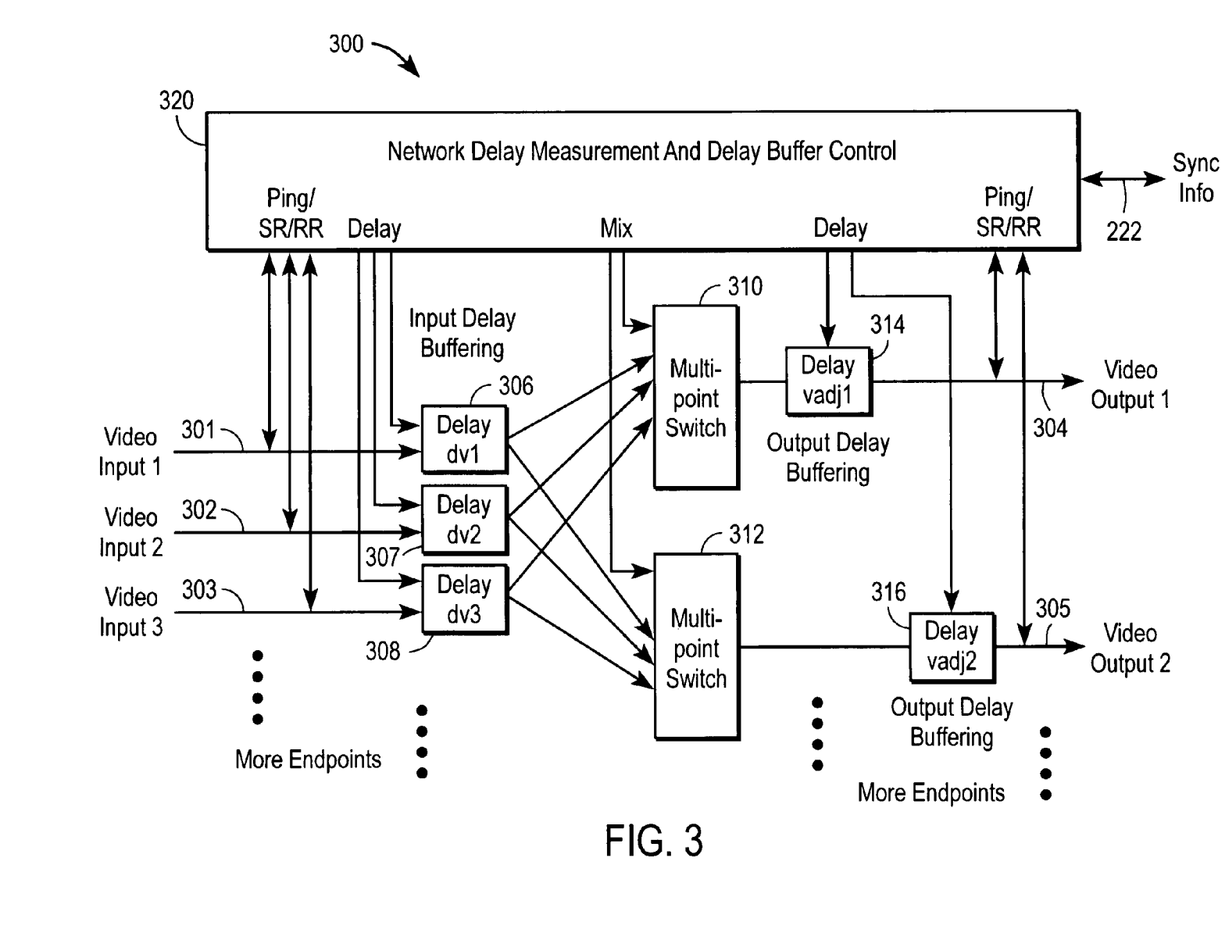
FIG. 3 is an example diagram of one embodiment of a video mixer.

Audio EP1-to-sum = dEP1a + da1 = 40 ms + 30 ms = 70 ms
Audio EP2-to-sum = dEP2a + da2 = 12 ms + 50 ms = 62 ms
Audio EP3-to-sum = dEP3a + da3 = 24 ms + 10 ms = 34 ms
Audio sum-to-EP4 = adout1 + dEP4a + aadj1 =
4 ms + 5 ms + 0 ms = 9 ms
Audio sum-to-EP5 = adout2 + dEP5a + aadj2 =
2 ms + 7 ms + 0 ms = 9 ms FIG. 3 is an example diagram of one embodiment of a video mixer 300, which, similar to the example of FIG. 2, includes a network delay measurement and delay buffer control unit 320 that receives video inputs from each endpoint device, e.g., video inputs 1-3 on lines 301-303, respectively. Each video input line 301-303 is coupled to a respective input delay buffer 306-308. Mixed video outputs 1 & 2 are shown produced by multipoint switches 310 & 312 on lines 304 & 305 for destination receiver endpoints EP4 & EP5, respectively. Each independent video switch 310 & 312 is associated with a respective output delay buffer 314 & 316 for ensuring that the sum of the relative offsets in each mixed video stream is equal to the relative offsets in the corresponding mixed audio stream. In other words, output delay buffers 314 and 316 produce respective delayed, mixed video output streams 304 and 305 for proper lipsync with the corresponding audio streams.

Consider the audio endpoint-to-summation unit values in the example given above (shown in Table 2). When video mixer 300 receives those audio delay values on connection 222, it adjusts the input delays (dv1-dv3) of buffers 306-308 to ensure that the relative offsets of the video streams 301-303 in the video mix equal the relative offsets in the audio mix. For example, assume that endpoint-to-multi-point switch (sum) unit video delays (with zero delay for dv1, dv2 and dv3) are dEP1$v$=13 ms, dEP2$v$=20 ms and dEP3$v$=10 ms.

Video mixer 300 establishes values for the video input delay buffers (dv1, dv2 and dv3) such that the relative endpoint-to-sum unit offsets for audio and video are the same. The video mixer performs this operation by first determining which of the audio streams is delayed the least, which in this case, happens to be the audio stream from EP3. As a result, video mixer 300 sets the corresponding video of delay buffer value, dv3, to zero. Next, the video mixer sets the other video input delay values (dv1 & dv2) such that the relative offsets between the audio and video streams are the same, which, for the example given results in the delay values shown below in Table 3

TABLE 3

(Video EP2-to-sum − Video EP3-to-sum) = (Audio EP2-to-sum − Audio EP3-to-sum)
((dEP2v + dv2) − (dEP3v + 0 ms)) = (Audio EP2-to-sum − Audio EP3-to-sum)
((20 ms + dv2) − (10 ms)) = (62 ms − 34 ms)
dv2 = 18 ms
(Video EP1-to-sum − Video EP3-to-sum) = (Audio EP1-to-sum − Audio EP3-to-sum)
((dEP1v + dv1) − (dEP3v + 0 ms)) = (Audio EP1-to-sum − Audio EP3-to-sum)
((13 ms + dv1) − (10 ms)) = (70 ms − 34 ms)
dv1 = 33 ms Now, the delays in the video path up to the video mixer summation units are given as:

$dEP1v+dv1=13$ ms$+33$ ms$=46$ ms $dEP2v+dv2=20$ ms$+18$ ms$=38$ ms $dEP3v+dv3=10$ ms$+0$ ms$=10$ ms

Note that at this point the relative offsets for the video paths are the same as the relative offsets for the audio path; that is, EP2 is delayed 20 ms more than EP3, and EP1 is delayed 8 ms more than EP2, for both the audio and video streams.

In a second phase of operation, the network delay measurement and delay buffer control unit 320 determines the appropriate output buffer delays to be introduced in the video output streams in order to achieve synchronization with the corresponding audio streams at the destination endpoint devices. The network delay measurement and delay buffer control unit 320 first calculates the end-to-end delay for the audio streams using the values it has received from the audio mixer on connection 222. Note that unit 320 need only calculate values for a single input stream, going to each output stream. In this example, using EP1: Audio EP1-to-EP4=Audio EP1-to-sum+Audio sum-to-EP4=70 ms+9 ms=79 ms; and Audio EP1-to-EP5=Audio EP1-to-sum+Audio sum-to-EP5=70 ms+9 ms=79 ms. Assuming that the delays in the video switch (summation) units are vout1=2 ms and vout2=2 ms, and assuming further that unit 320 has calculated the one-way network delays from video mixer 122 to the endpoints as dEP4v=15 ms and dEP5v=20 ms, then the resulting delay values (assuming vadj1=vadj2=0) for the present example are given below in Table 4.

TABLE 4

Video EP1-to-EP4 = (dEP1v + dv1 + vout1 + vadj1 + dEP4v)

= (13 ms + 33 ms + 2 ms + 0 ms + 15 ms) = 63 ms

Video EP1-to-EP5 = (dEP1v + dv1 + vout2 + vadj2 + dEP5v)

= (13 ms + 33 ms + 2 ms + 0 ms + 20 ms) = 68 ms

And because the corresponding delay in the audio path for the same input stream, EP1, is 79 ms, the video mixer sets the delay values as vdadj1=79 ms−63 ms=16 ms; and vdadj2=79 ms−68 ms=11 ms. Adding these adjustments to the video output streams via delay buffers 314 & 316 ensures that the end-to-end audio delays equal the corresponding end-to-end video delays.

It is appreciated that if the end-to-end audio delays are less than the end-to-end video delays, then the audio streams are delayed instead of the video streams. Consistent with the example method given above, in the case where the audio delays are less than the video delays, the audio mixer ends up adjusting its delay values to achieve the same end-to-end delay as the video streams.

In terms of the example shown in FIG. 1, audio mixer 120 and video mixer 122 exchange messages periodically in order to keep the delay value information current. If either mixer device measures a change in delay values for any of its streams, that information is communicated to the other mixer device.

In the event that the audio mixer and video mixer cannot determine the relevant audio and video streams pairs, such information may be communicated by a third-party network device.

Figure 5:
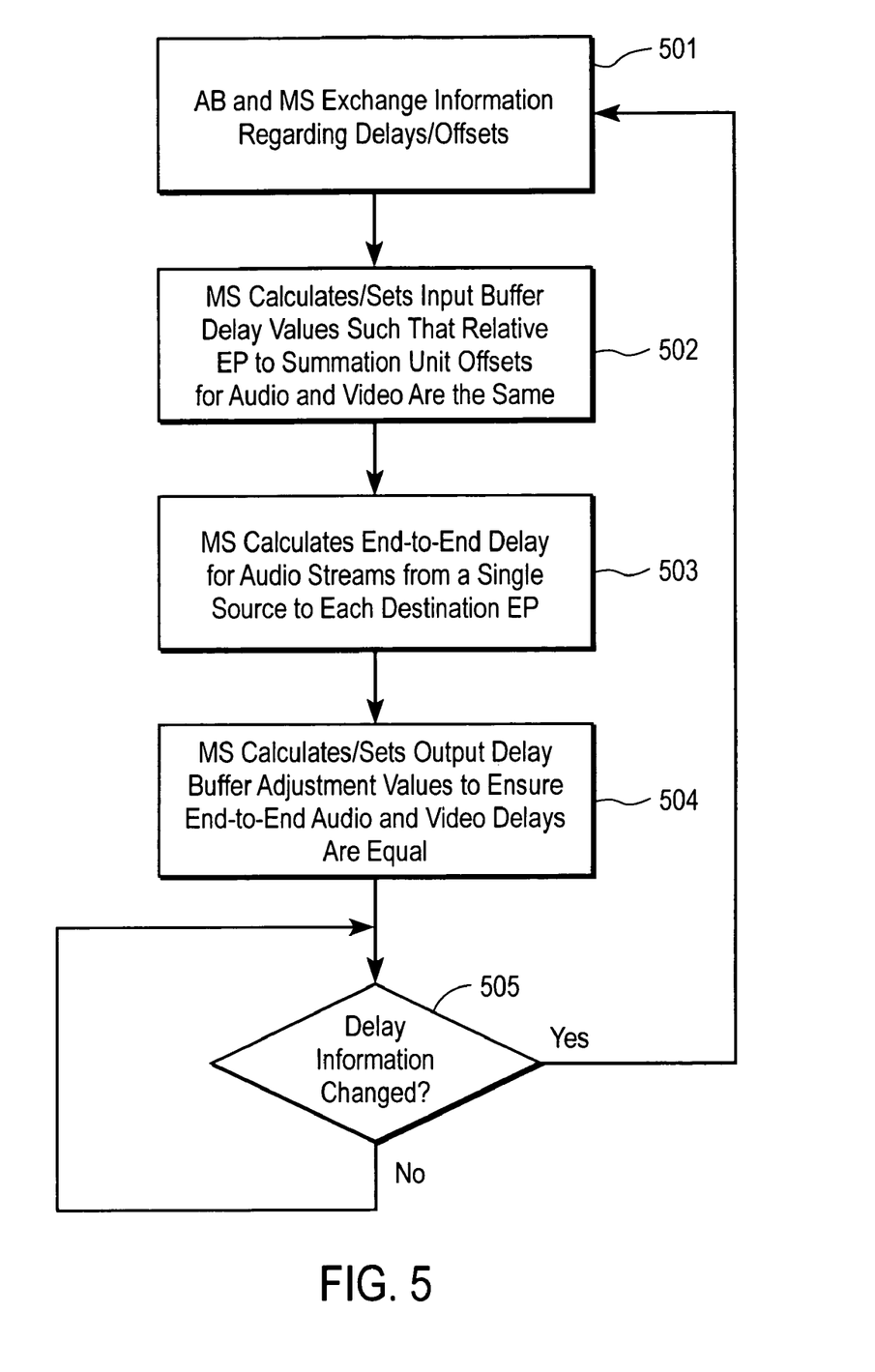
FIG. 5 illustrates an example method of operation for an audio mixer and a video mixer.

FIG. 5 illustrates an example method of operation for an audio mixer and a video mixer for the purpose of achieving lipsync. The process begins at block 501, wherein the audio mixer and a video mixer exchange information regarding delays/offsets that have been measured/calculated by each device. Assuming that the end-to-end audio delays are less than the end-to-end video delays, the media switch next calculates/sets the input buffer delay values such that the relative endpoint-to-summation unit offsets for each of the corresponding audio and video streams are identical (block 502).

Next, the video mixer calculates the end-to-end delay for audio streams originating at a single source endpoint destined for each of the various receiver endpoints (block 503). These calculations are performed using the relative delay/offset values previously provided by the audio mixer in the information exchange. The video mixer uses the results of the end-to-end audio delay calculations to calculate and then set the output delay buffer adjustment values in order to equalize the end-to-end audio and video delays (block 504). In the event that the delay/offset information changes for either the audio mixer or video mixer (block 505), the entire process is repeated.

In the case where the sending or source endpoints utilize RTCP, but the receiving or destination endpoints are dumb, the audio mixer and video mixer may achieve relative synchronization without measuring the network delays from the source endpoints to the audio mixer/video mixer. Instead, the devices may utilize information in the RTCP streams from the endpoints. In this case, the audio mixer and video mixer can generate audio and video streams that are synchronized using a master clock provided by the audio mixer. The timestamps are in units of NTP time. In such a scenario, the audio mixer and video mixer calculate the mapping between the NTP timestamps, and the arrival time at the destination endpoint. Then, each device determines the offset between the arrival times of the audio and video streams. For the audio mixer, and this mapping is: NTP real=NTPts*M+k_audio, where NTPts is the NTP timestamp, M is the scale factor that accounts for skew between timestamps and a master clock, and k is an offset. Likewise, the mapping for the video mixer is: NTP real=NTPts*M+k_video. (The factor M is the same for both devices, and is close to 1.0000.) The audio mixer and video mixer may determine the difference in arrival times by exchanging k values.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:
1. A method comprising:
  receiving, by a video mixer, information from an audio mixer that includes delay values respecting input audio streams received by the audio mixer from a plurality of source endpoints, and output audio streams sent without timestamps from the audio mixer to a plurality of destination endpoints that do not extract Real-Time Transport Control Protocol (RTCP) packets, each input and output audio stream being respectively associated with a corresponding input and output video stream, the video mixer and the audio mixer being physically located at different places on a communication network;

calculating, from the information received, an output delay value for each corresponding output video stream to ensure that source endpoint-to-destination endpoint audio and video delays are substantially equal;

buffering, by the video mixer, each of the corresponding input and output video streams; and adjusting the buffering of each of the corresponding input and output video streams so as to delay each corresponding output video stream by the output delay value.

2. The method of claim 1 wherein the delay values include, for each of the input audio streams, a first delay from a source endpoint to a summation unit of the audio mixer, and for each of the output audio streams, a second delay from the summation unit to a destination endpoint.

3. The method of claim 1 further comprising:

calculating, from the information received, a source endpoint-to-destination endpoint audio delay from one of the source endpoints to one of the destination endpoints.

4. The method of claim 1 further comprising:

receiving, by the video mixer, new information from the audio mixer that includes updated delay values.

5. A method comprising:

receiving, by an audio mixer, information from an video mixer that includes delay values respecting input video streams received by the video mixer from a plurality of source endpoints, and output video streams sent without timestamps from the video mixer to a plurality of destination endpoints that do not extract Real-Time Transport Control Protocol (RTCP) packets, each input and output video stream being respectively associated with a corresponding input and output audio stream, the video mixer and the audio mixer being physically located at different places on a communication network, the delay values including, for each of the input video streams, a first delay from a source endpoint to a summation unit of the video mixer, and for each of the output video streams, a second delay from the summation unit to a destination endpoint;

calculating, from the information received, an output delay value for each corresponding output audio stream to ensure that source endpoint-to-destination endpoint audio end video delays are substantially equal;

buffering, by the audio mixer, each of the corresponding input and output audio streams;

adjusting the buffering of each of the corresponding input and output audio streams so as to delay each corresponding output audio stream by the output delay value.

6. The method of claim 5 further comprising:

calculating, from the information received, a source endpoint-to-destination endpoint video delay from one of the source endpoints to one of the destination endpoints.

7. The method of claim 5 further comprising:

receiving, by a audio mixer, new information from the video mixer that includes updated delay values.

8. A computer readable memory encoded with a computer program product, when executed the computer program product being operable to:

during a video conference session, receive information from an audio mixer on a communication network, the information including delay values respecting input audio streams received by the audio mixer from a plurality of source endpoints, and output audio streams sent without timestamps from the audio mixer to a plurality of destination endpoints that do not extract Real-Time Transport Control Protocol (RTCP) packets, each input and output audio stream being respectively associated with a corresponding input and output video stream, the delay values including, for each of the input audio streams, a first delay from a source endpoint to a summation unit of the audio mixer, and for each of the output audio streams, a second delay from the summation unit to a destination endpoint;

calculate, from the information received, an output delay value for each corresponding output video stream to ensure that source endpoint-to-destination endpoint audio and video delays are substantially equal;

buffer, by a video mixer, each of the corresponding input and output video streams; and adjust the buffering so as to delay each corresponding output video stream by the output delay value.

9. A computer readable memory encoded with a computer program product, when executed the computer program product being operable to:

during a video conference session, receive information from a video mixer physically located at a different place on a communication network, the information including delay values respecting input video streams received by the video mixer from a plurality of source endpoints, and output video streams sent without timestamps from the video mixer to a plurality of destination endpoints that do not extract Real-Time Transport Control Protocol (RTCP) packets, each input and output video stream being respectively associated with a corresponding input and output audio stream, the delay values including, for each of the input video streams, a first delay from a source endpoint to a switch of the video mixer, and for each of the output video streams, a second delay from the switch to a destination endpoint;

calculate, from the information received, an output delay value for each corresponding output audio stream to ensure that source endpoint-to-destination endpoint audio and video delays are substantially equal;

buffer, by an audio mixer, each of the corresponding input and output audio streams; and adjust the buffering so as to delay each corresponding output audio stream by the output delay value.

* * * * *